(12) United States Patent
Song (10) Patent No.: US 11,835,779 B2
(45) Date of Patent: *Dec. 5, 2023

(54) OPTICAL FIBER CABLE MANUFACTURING EQUIPMENT

(71) Applicant: HYESUNG Cable & Communication INC., Iksan-si (KR)

(72) Inventor: Young Bin Song, Seoul (KR)

(73) Assignee: HYESUNG CABLE & COMMUNICATION INC., Iksan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,508

(22) Filed: Jun. 22, 2022

(65) Prior Publication Data
US 2023/0213717 A1 Jul. 6, 2023

(30) Foreign Application Priority Data
Jan. 5, 2022 (KR) ......................... 10-2022-0001274

(51) Int. Cl.
*G02B 6/44* (2006.01)

(52) U.S. Cl.
CPC .......... *G02B 6/4436* (2013.01); *G02B 6/441* (2013.01); *G02B 6/443* (2013.01); *G02B 6/4488* (2013.01)

(58) Field of Classification Search
CPC ...... G02B 6/4488; G02B 6/441; G02B 6/443; G02B 6/4436
USPC ....................................................... 385/128
See application file for complete search history.

(56) References Cited

FOREIGN PATENT DOCUMENTS

KR 20110012705 A 2/2011

*Primary Examiner* — Jerry M Blevins
(74) *Attorney, Agent, or Firm* — STIP Law Group, LLC (57) ABSTRACT

The disclosure provides optical fiber cable manufacturing equipment including a collective core portion including a plurality of optical fibers, a metal tape disposed outside the collective core portion, and a sheath portion disposed outside the metal tape, the optical fiber cable manufacturing equipment including: a pre-bonding portion configured to pre-bond the metal tape to the outside of the collective core portion; a first coating portion disposed behind the pre-bonding portion to coat a first adhesive over at least part of both ends of the metal tape; a bonding portion disposed behind the pre-bonding portion to bond the metal tape to the outside of the collective core portion with the both ends of the metal tape overlapping each other; a second coating portion disposed behind the bonding portion to coat a second adhesive over the outside of the metal tape; and a sheath fabrication portion disposed behind the second coating portion to cover the collective core portion to which the metal tape is bonded, with a sheath, wherein an upper portion of the collective core portion to which the metal tape is bonded is heated before the collective core portion to which the metal tape is bonded enters the second coating portion, wherein the second adhesive is coated only over a lower portion of the collected core portion to which the metal tape is bonded in the second coating portion, wherein a melting point of the first adhesive is higher than a melting point of the first adhesive.

5 Claims, 5 Drawing Sheets

OPTICAL FIBER CABLE MANUFACTURING EQUIPMENT

CROSS-REFERENCE TO RELATED APPLICATIONS

This application claims the priority of the Korean Patent Applications 10-2022-0001274 filed on Jan. 5, 2022, in the Korean Intellectual Property Office, the disclosure of which is incorporated herein by reference.

TECHNICAL FIELD

The disclosure relates to equipment for manufacturing an optical fiber cable which includes an optical fiber bundle therein and a metal tape enclosing the optical fiber bundle, and more particularly, to optical fiber cable manufacturing equipment for manufacturing an optical fiber cable, which facilitates a sheath stripping operation for an intermediate branch or end connecting operation in the field.

BACKGROUND ART

An optical fiber cable includes a collective core portion which includes an optical fiber bundle therein and a central strength member. Optical fibers may be disposed in a loose tube. The central strength member may be disposed in the center of the collective core portion, and a plurality of loose tubes may be disposed around the central strength member.

A sheath portion encloses the outside of the collective core portion. In addition, a metal tape may be disposed between the collective core portion and the sheath portion. The metal tape may have a wrinkled shape. The metal tape serves to prevent foreign substances from entering the inside of the collective core portion and to prevent deformation of the optical fiber cable.

Equipment for manufacturing such an optical fiber cable includes a configuration for bonding the metal tape to the collective core portion and covering the collective core portion to which the metal tape is bonded with the sheath portion. In order to cover the collective core portion to which the metal tape is bonded with the sheath portion, an adhesive is coated over the outside of the metal tape. The sheath portion may be bonded to the metal tape through the coated adhesive.

In order to perform an intermedia branch or end connecting operation of the optical fiber cable, a part of the sheath portion of the optical fiber cable should be stripped to expose the collective core portion, to which the metal tape is bonded, to the outside at an end of the optical fiber cable. An operator may proceed with the operation of stripping the sheath portion in the field, and adhesion between the sheath portion and the collective core portion to which the metal tape is bonded may be so strong that the operator has difficulty in stripping the sheath portion. In addition, the metal tape or the collective core portion may be frequently damaged during the sheath stripping operation.

PRIOR ART LITERATURE

Patent Literature (Patent Literature 0001) Korean Patent Laid-Open Publication No. 10-2011-0012705 (published on Feb. 9, 2011)

DETAILED DESCRIPTION OF THE PRESENT DISCLOSURE

Technical Objects

The disclosure aims at providing optical fiber cable manufacturing equipment for manufacturing an optical fiber cable, by which an operator can easily strip a sheath portion to perform an intermediate branch or end connecting operation in the field.

The object to be achieved by the disclosure is not limited to that mentioned above, and other objects that are not mentioned above may be clearly understood by those skilled in the art based on the description provided below.

Technical Solving Means

The disclosure may provide optical fiber cable manufacturing equipment including a collective core portion including a plurality of optical fibers, a metal tape disposed outside the collective core portion, and a sheath portion disposed outside the metal tape, the optical fiber cable manufacturing equipment including: a pre-bonding portion configured to pre-bond the metal tape to the outside of the collective core portion; a first coating portion disposed behind the pre-bonding portion to coat a first adhesive over at least part of both ends of the metal tape; a bonding portion disposed behind the pre-bonding portion to bond the metal tape to the outside of the collective core portion with the both ends of the metal tape overlapping each other; a second coating portion disposed behind the bonding portion to coat a second adhesive over the outside of the metal tape; and a sheath fabrication portion disposed behind the second coating portion to cover the collective core portion to which the metal tape is bonded, with a sheath, wherein an upper portion of the collective core portion to which the metal tape is bonded is heated before the collective core portion to which the metal tape is bonded enters the second coating portion, wherein the second adhesive is coated only over a lower portion of the collected core portion to which the metal tape is bonded in the second coating portion, wherein a melting point of the first adhesive is higher than a melting point of the first adhesive.

The second coating portion may include an adhesive supply portion configured to supply the second adhesive, a frame, and a roller portion rotatably disposed on the frame to come into contact with the collective core portion to which the metal tape is bonded, the roller portion may include a recess which is in contact with the collective core portion to which the metal tape is bonded, and only a lower portion of the collective core portion to which the metal tape is bonded may be received in the recess, and the adhesive supply portion may supply the second adhesive to the recess.

The optical fiber cable manufacturing equipment may further include: a first heating portion configured to melt the first adhesive supplied from the first coating portion; a second heating portion configured to heat the roller portion of the second coating portion to melt the second adhesive; a third heating portion disposed on the bonding portion to heat the collective core portion to which the metal tape is bonded; and a fourth heating portion disposed behind the bonding portion to heat an upper side of the collective core portion to which the metal tape is bonded.

The bonding portion may include a first bonding portion and a second bonding portion which is disposed behind the first bonding portion and spaced apart therefrom, the fourth heating portion may heat the collective core portion to which the metal tape is bonded, escaping from the first bonding portion, and the optical fiber cable manufacturing equipment may further include a heat loss prevention cover disposed across the first bonding portion and the second bonding portion, and disposed above the collective core portion to which the metal tape is bonded.

The roller portion may include a hub including a plurality of arms to be rotatably coupled to the frame, and rollers rotatably coupled to the plurality of arms, respectively, any one of the plurality of rollers may selectively come into contact with the collective core portion to which the metal tape is bonded, the second coating portion may include a support portion fixed to the frame, and a collection container removably coupled to the support portion, and the collection container may include a body which has a receiving space formed therein and is coupled to the support portion, and a scraper which is extended from the body and comes into contact with the roller that is in contact with the collective core portion to which the metal tape is bonded, among the plurality of rollers.

Advantageous Effects

In an embodiment, before the second adhesive is coated to couple the sheath portion, the upper side of the collective core portion to which the metal tape is bonded is heated, so that the second adhesive is prevented from being coated over the upper side of the collective core portion to which the metal tape is bonded. Then, the optical fiber cable is manufactured by coating the second adhesive only over the lower side of the collective core portion to which the metal tape is bonded, so that adhesion of the sheath portion is maintained and an operation of stripping the sheath portion for an intermediate branch or end connecting operation is easily performed.

In an embodiment, the melting point of the first adhesive for bonding the metal tape to the collective core portion is higher than the melting point of the second adhesive for bonding the sheath portion, so that adhesion of the metal tape increases and the operation of stripping the sheath portion is easily performed.

In an embodiment, the roller including the recess to receive only the lower side of the collective core portion to which the metal tape is bonded is provided to coat the second adhesive, so that the second adhesive is prevented from being coated over all areas of the collective core portion to which the metal tape is bonded.

In an embodiment, the roller contacting the collective core portion to which the metal tape is bonded is selectively replaced, so that a bonding portion between the collective core portion to which the metal tape is bonded and the sheath portion is prevented from being contaminated.

In an embodiment, the scraper to scrape the residue of the second adhesive flowing down from the roller, and the collection container including the body to store the scraped second adhesive or foreign substances are provided, so that the bonding portion between the collective core portion to which the metal tape is bonded and the sheath portion is prevented from being contaminated.

BEST MODE FOR EMBODYING THE INVENTION

Objects, specific advantages, and new features of the disclosure will be more apparent from detailed descriptions associated with the accompanying drawings and preferred embodiments. In addition, the terms or words used in the specification and the claims should not be interpreted as being limited to ordinary or lexical meanings, and should be interpreted as having meanings and concepts conforming to the technical concept of the disclosure, based on the principle that an inventor can appropriately define a concept of a term in order to explain his/her invention in the best way. In the description of the disclosure, detailed explanations of well-known technology of related art are omitted when it is deemed that they may unnecessarily obscure the essence of the disclosure.

In explaining optical fiber cable manufacturing equipment according to an embodiment, when an element is referred to as being formed or disposed "on," "over," or "above" or "under" or "below" another element, the two elements may be disposed in contact with each other or there may be one or more other intervening elements formed or disposed between the two elements. The expressions "on," "over," or "above" or "under" or "below" may refer to an upward direction or a downward direction with reference to one element.

In addition, such terms as first, second may be used to simply distinguish a corresponding element from another, and do not limit the elements in other aspects such as importance or order.

Figure 1:
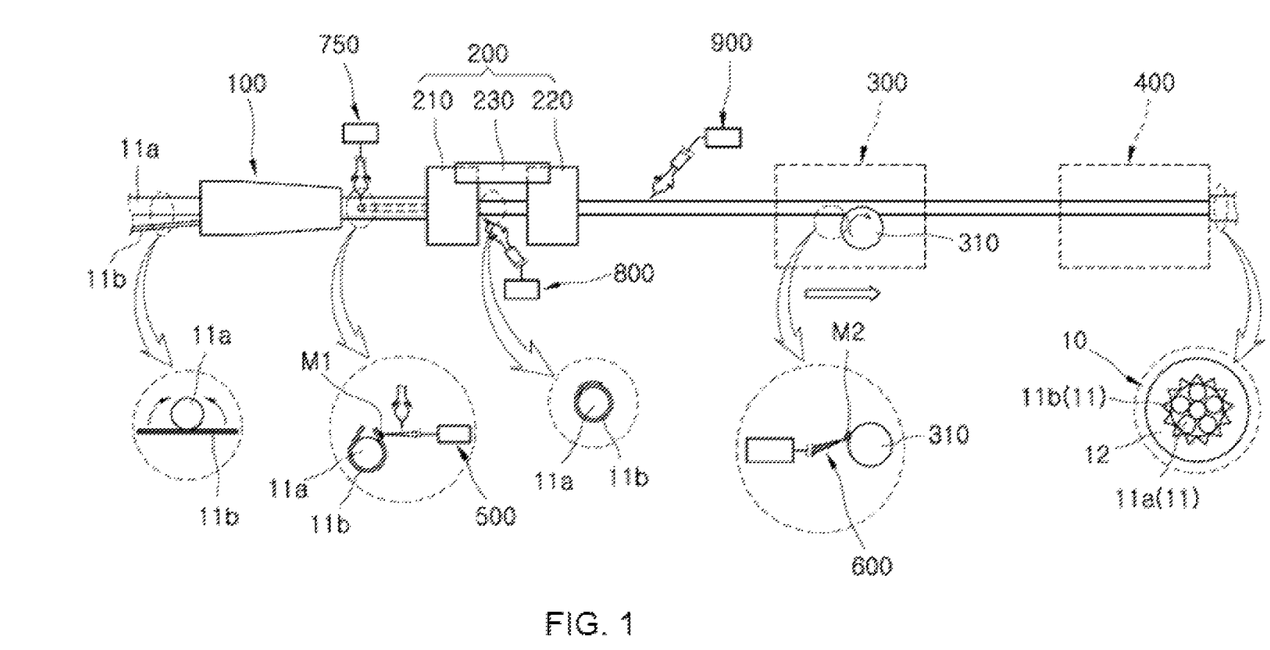
FIG. 1 is a view illustrating optical fiber cable manufacturing equipment according to an embodiment.

FIG. 1 is a view illustrating optical fiber cable manufacturing equipment according to an embodiment. In FIG. 1, a direction from the left to the right on the drawing is an advancing direction of a manufacturing process. Hereinafter, "in front of," "behind" are defined with reference to the advancing direction of the manufacturing process of an optical fiber cable.

Referring to FIG. 1, the optical fiber cable manufacturing equipment according to an embodiment may include a pre-bonding portion 100, a bonding portion 200, a first coating portion 500, a second coating portion 300, and a sheath fabrication portion 400.

With reference to the advancing direction of the manufacturing process of the optical fiber cable, the pre-bonding portion 100, the first coating portion 500, the bonding portion 200, the second coating portion 300, and the sheath fabrication portion 400 may be disposed in sequence. A cooling portion (not shown) may be provided behind the sheath fabrication portion 400 to cool an optical fiber cable.

A collective core portion 11a and a metal tape 11b may be supplied to the pre-bonding portion 100 all together. The collective core portion 11a may include a loose tube including an optical fiber therein, and a central strength member. The metal tape 11b is a member that encloses the collective core portion 11a, and prevents foreign substances from entering the inside of the collective core portion 11a and prevents deformation of the optical fiber cable.

The metal tape 11b is supplied to the pre-bonding portion 100 in a flat state. The pre-bonding portion 100 rolls the metal tape 11b and pre-bonds the metal tape 11b to the collective core portion 11a to let the metal tape 11b enclose the collective core portion 11a. The collective core portion 11a passing through the pre-bonding portion 100 is enclosed by the metal tape 11b, and both ends of the metal tape 11b are left in an open state.

The first coating portion 500 is disposed behind the pre-bonding portion 100. The first coating portion 500 coats the metal tape 11b pre-bonded to the collective core portion 11a with a first adhesive M1 (for example, hotmelt). The first coating portion 500 may coat the first adhesive M1 over at least one of the both ends of the metal tape 11b that are in the open state. A nozzle of the first coating portion 500 is disposed adjacent to the end of the metal tape 11b. When the collective core portion 11a including the metal tape 11b pre-bonded thereto moves backward, a coating area of the first adhesive M1 is continuously formed from the end of the metal tape 11b along a transfer direction.

In order to melt the first adhesive M1, a first heating portion 750 may be provided. The first heating portion 750 may melt the first adhesive M1 by directly heating the nozzle of the first coating portion 500. A melting point of the first adhesive M1 may be within a range from 150° to 180°, for example, and may be higher than a melting point of a second adhesive M2 (for example, a range from 130° to 170°) coated by the second coating portion 300, so that the first adhesive M1 bonds the metal tape 11b to the collective core portion 11a more strongly than a sheath portion 12.

The collective core portion 11a enters the bonding portion 200 with the both ends of the metal tape 11b being in the open state and the first adhesive M1 being coated over the both ends.

The bonding portion 200 is disposed behind the first coating portion 500 to bond the metal tape 11b to an outside of the collective core portion 11a with the both ends of the metal tape 11b overlapping each other.

The bonding portion 200 may include a first bonding portion 210 and a first bonding portion 220. The first bonding portion 220 is disposed behind the first bonding portion 210 and spaced apart therefrom. The metal tape 11b is primarily bonded to the collective core portion 11a in the first bonding portion 210. The collective core portion 11a to which the metal tape 11b is bonded through the first bonding portion 210 may be directly heated through a third heating portion 800.

The third heating portion 800 may serve to completely melt the first adhesive M1 which goes through the first bonding portion 210 but is not still melted, by heating the collective core potion 11 to which the metal tape is bonded.

The collective core portion 11 to which the metal tape is bonded, heated by the third heating portion 800, enters the second bonding portion 220. In the second bonding portion 220, the metal tape 11b is bonded to the collective core portion 11a again.

The collective core portion 11 to which the metal tape is bonded, passing through the second bonding portion 220, is heated through a fourth heating portion 900. The fourth heating portion 900 may be disposed behind the first bonding portion 220 to heat an upper side of the collective core portion 11 to which the metal tape is bonded. This is to prevent the second adhesive M2 to be coated in the second coating portion 300 from being coated over the upper side of the collective core portion 11 to which the metal tape is bonded. When the upper side of the collective core portion 11 to which the metal tape is bonded is heated and its temperature increases, the second adhesive M2 may flow down without adhering. Therefore, the second adhesive M2 is prevented from excessively sticking to the upper side of the collective core portion 11 to which the metal tape is bonded.

The bonding portion 200 may include a heat loss prevention cover 230. The heat loss prevention cover 230 may be disposed across the first bonding portion 210 and the second bonding portion 220, and may be disposed above the collective core portion 11 to which the metal tape is bonded to prevent heat of the first heating portion 750 from being lost to the outside.

The second coating portion 300 may be disposed behind the bonding portion 200 to coat the second adhesive M2 (for example, hotmelt).

Figure 2:
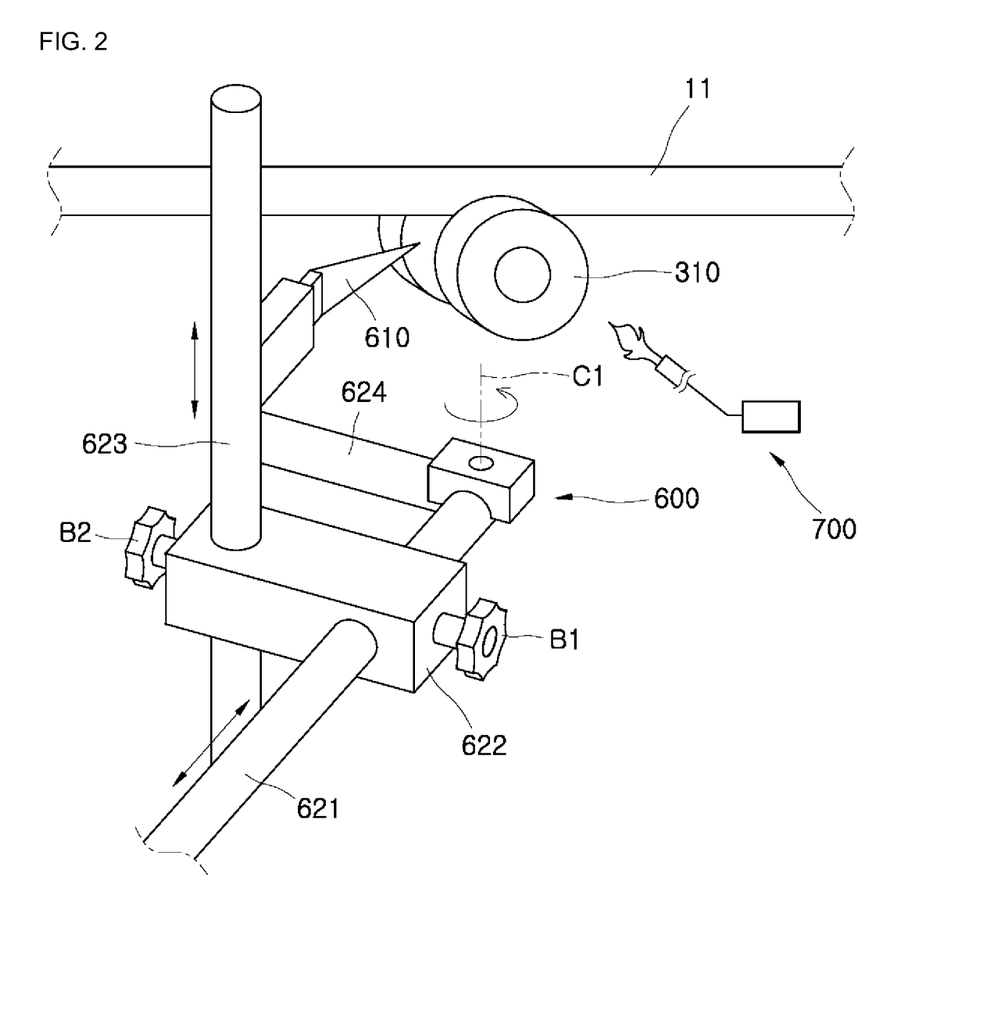
FIG. 2 is a perspective view of a second coating portion.
Figure 3:
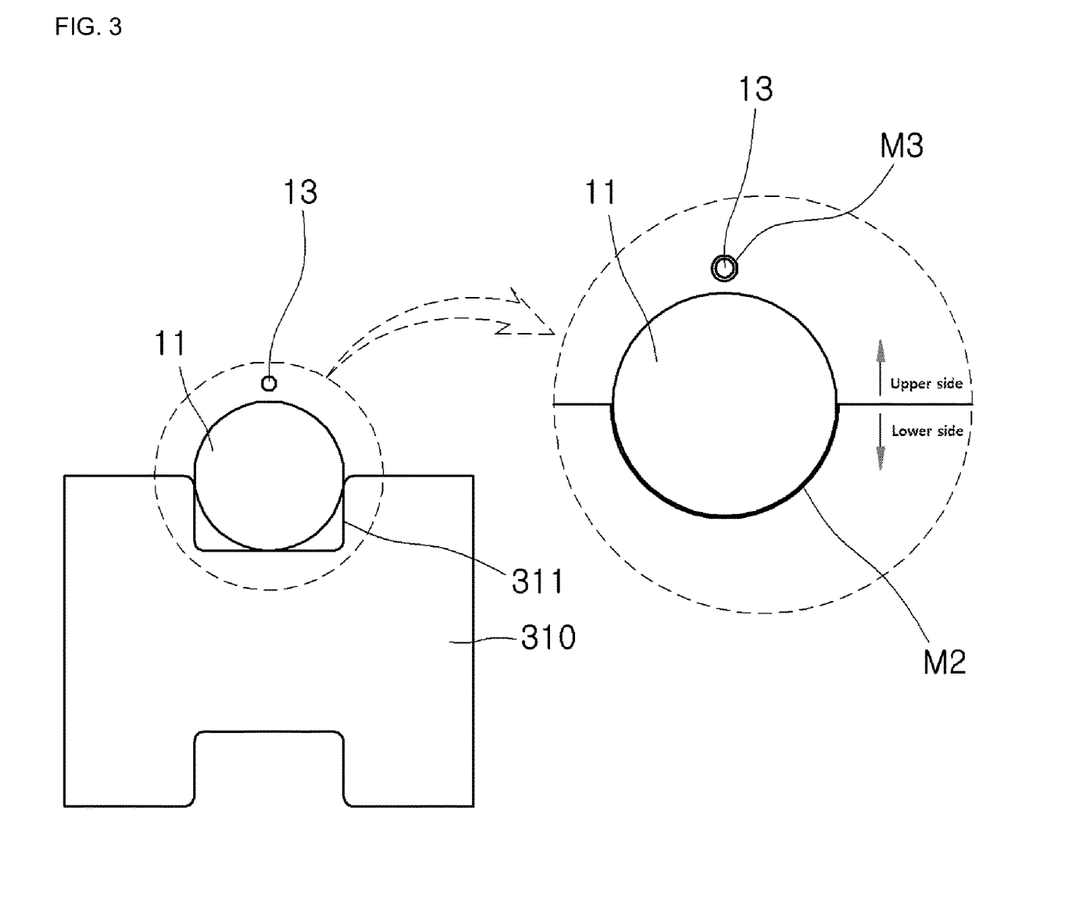
FIG. 3 is a front view of a roller portion shown in FIG. 2.

FIG. 2 is a perspective view of the second coating portion 300, and FIG. 3 is a front view of a roller portion shown in FIG. 2.

Referring to FIGS. 2 and 3, the second coating portion 300 is to coat the second adhesive M2 over the collective core portion 11 to which the metal tape is bonded. The second adhesive M2 bonds the collective core portion 11 to which the metal tape is bonded and the sheath portion 12.

In this case, the second coating portion 300 may coat the second adhesive M2 only over a lower side of the collective core portion 11 to which the metal tape is bonded. That is, by coating the second adhesive M2 only over a half area of the collective core portion 11 to which the metal tape is bonded, adhesion between the collective core portion 11 to which the metal tape is bonded and the sheath portion 12 is guaranteed, and also, the sheath portion 12 is induced to be easily stripped from the collective core portion 11 to which the metal tape is bonded.

The second coating portion 300 may include an adhesive supply portion 600 and a roller portion 310. The adhesive supply portion 600 may include a nozzle 610 to discharge the second adhesive M2 and a position adjustment portion to adjust a position of the nozzle 610. The nozzle may be disposed adjacent to the roller portion 310.

The position adjustment portion may include a horizontal shaft 621, a vertical shaft 623, and a body 622. The body 622 may be coupled to the horizontal shaft 621 to be movable along the horizontal shaft 621. In addition, the body 622 may be coupled to the vertical shaft 623 to be movable along the vertical shaft 623. When the body 622 moves, any one of the horizontal shaft 621 and the vertical shaft 623 moves along with the body 622.

A first bolt B1 may be disposed on one side of the body 622. The first bolt B1 may be screwed into the body 622 to fix the body 622 to the horizontal shaft 621. A second bolt B2 may be disposed on the other side of the body 622. The second bolt B2 may be screwed into the body 622 to fix the body 622 to the vertical shaft 623.

In addition, the position adjustment portion may further include an arm portion 624 coupled to the horizontal shaft 621. The arm portion 624 connects the nozzle 610 and the horizontal shaft 621. The arm portion 624 may be coupled to the horizontal shaft 621 to be rotatable about a first axis C1. The arm portion 624 may have a curved shape.

The position adjustment portion described above may adjust the position of the nozzle 610 in three-axis directions so as to align an end of the nozzle 610 with the roller portion 310.

The roller portion 310 may be rotatably coupled to a frame of the second coating portion 300. The roller portion 310 rotates due to a friction with the collective core portion 11 to which the metal tape is bonded. The roller portion 310 includes a recess 311. The lower side of the collective core portion 11 to which the metal tape is bonded is received in the recess 311. A cross-sectional shape of the recess 3100 is a "⊏"-like shape to form a space to receive the lower side of the collective core portion 11 to which the metal tape is bonded.

The second coating portion 300 supplies the second adhesive M2 to the recess 311. When the roller portion 310 is rotated with the second adhesive M2 being received in the recess 311, the second adhesive M2 is continuously coated over the lower side of the collective core portion 11 to which the metal tape is bonded.

Through the roller portion 310, the second adhesive M2 is coated only over the lower side of the collective core portion 11 to which the metal tape is bonded, and the second adhesive M2 is not coated over the upper side of the collective core portion 11 to which the metal tape is bonded. Accordingly, there is an advantage that it is easy to strip the sheath portion 12. In particular, since the upper side of the collective core portion 11 to which the metal tape is bonded is heated before entering the second coating portion 300 and its temperature increases, the second adhesive M2 does not stick to the upper side of the collective core portion 11 to which the metal tape is bonded, so that the sheath portion 12 may be easily stripped.

Since the lower side of the collective core portion 11 to which the metal tape is bonded is bonded to the sheath portion 12 through the second adhesive M2, sufficient adhesion between the collective core portion 11 to which the metal tape is bonded and the sheath portion 12 may be guaranteed.

A second heating portion 700 for heating the roller portion 310 may be included. The second heating portion 700 may heat the roller portion 310 to melt the second adhesive M2 received in the recess 311. In this case, the melting point of the second adhesive M2 is lower than the melting point of the first adhesive M1. This is to reduce adhesion between the sheath portion 12 and the collective core portion 11 to which the metal tape is bonded lower than adhesion between the metal tape 11b and the collective core portion 11a, and to make the sheath portion 12 be easily stripped.

Figure 4:
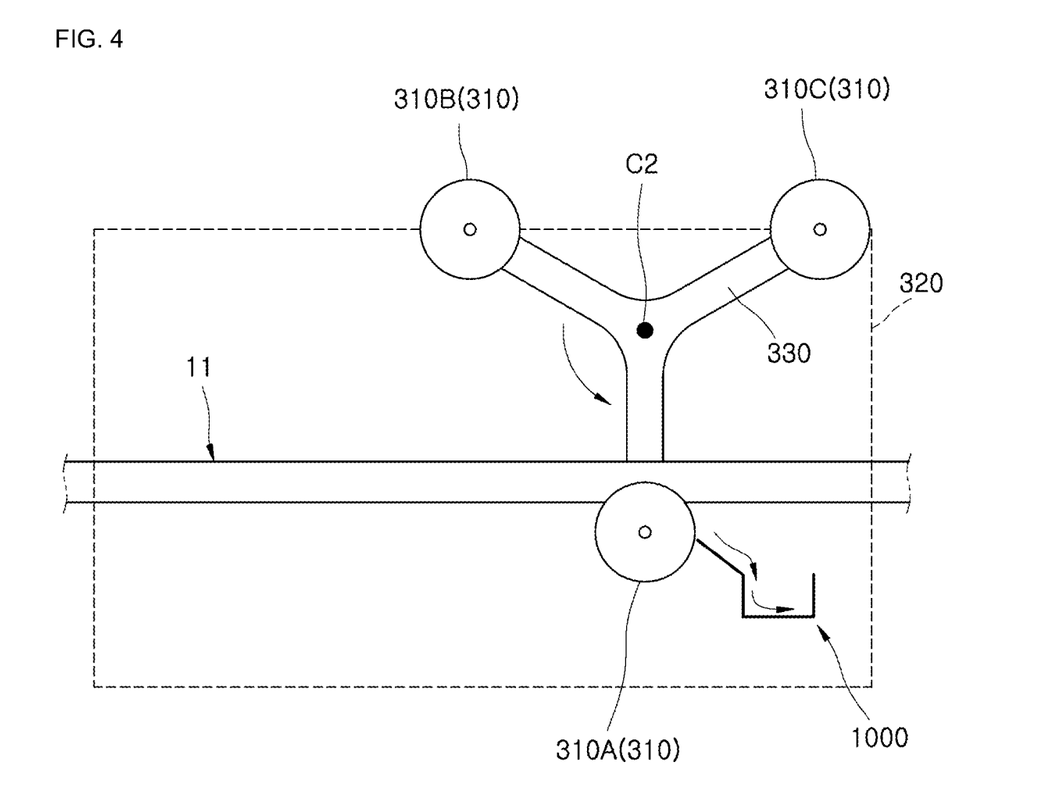
FIG. 4 is a front view of the roller portion illustrating the roller portion according to a modified embodiment.
Figure 5:
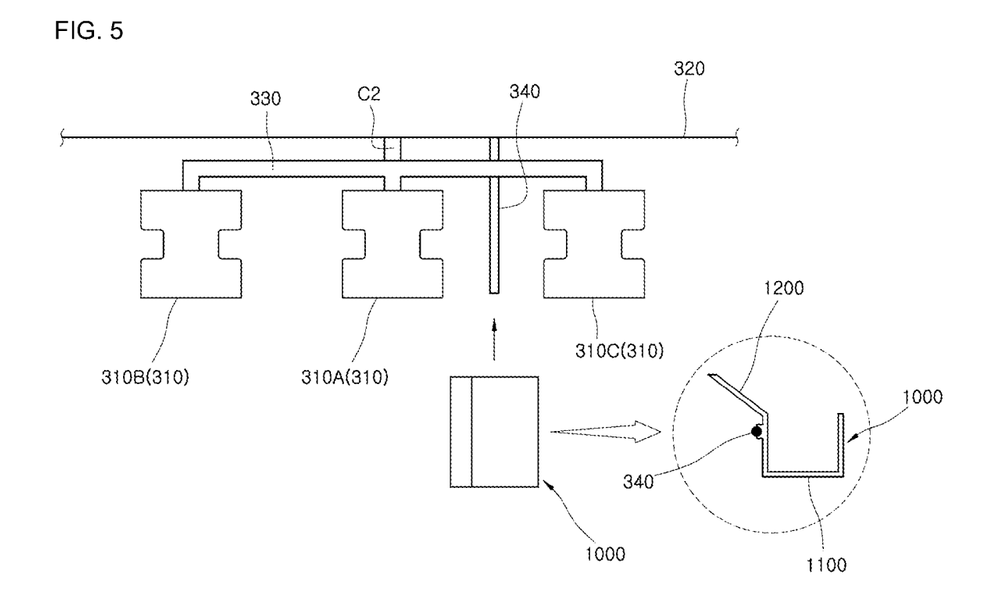
FIG. 5 is a top view of the roller portion shown in FIG. 4.

FIG. 4 is a front view of the roller portion 310 illustrating the roller portion 310 according to a modified embodiment, and FIG. 5 is a top view of the roller portion 310 shown in FIG. 4.

Referring to FIGS. 4 and 5, the roller portion 310 may include a hub 330 including a plurality of arms rotatably coupled to the frame 320, and rollers 310A, 310B, 310C rotatably coupled to the hub 330.

When the hub 330 rotates, any one of the plurality of rollers 310A, 310B, 310C selectively comes into contact with the collective core portion 11 to which the metal tape is bonded. A user may check a state of the roller 310A, 310B, 310C and rotate the hub 330 to bring a new roller 310A, 310B, 310C into contact with the collective core portion 11 to which the metal tape is bonded. Since a contaminated roller may be directly replaced, a bonding portion between the collective core portion 11 to which the metal tape is bonded and the sheath portion 12 may be prevented from being contaminated.

In addition, the second coating portion 300 may include a support portion 340 fixed to the frame 320, and a collection container 1000 removably coupled to the support portion 340.

The collection container 1000 may include a body 1100 and a scraper 1200 extended from the body 1100.

The body 1100 has a receiving space formed therein. In addition, the body 110 may include a structure such as a recess, a hole, or a slot to be coupled with the support portion 340. The scraper 1200 comes into contact with any one of the plurality of rollers 310A, 310B, 310C that is in contact with the collective core portion 11 to which the metal tape is bonded, and scrapes the second adhesive M2 remaining on the roller 310a or foreign substances and guides the scraped substances to the collection container 1000. The second adhesive M2 or foreign substances remaining on the roller 310A are removed through the collection container 1000, so that a bonding portion between the collective core portion 11 to which the metal tape is bonded and the sheath portion 12 is prevented from being contaminated.

Up to now, the optical fiber cable manufacturing equipment according to one preferred embodiment of the disclosure has been described in detail with reference to the accompanying drawings.

One embodiment of the disclosure described above should be understood as being merely an example in all aspects and not being limited, and the scope of the disclosure is defined not by the detailed descriptions explained above, but by the appended claims described below. In addition, it should be understood that not only the meaning and the scope of the claims but also all changes or changeable forms derived from equivalent concepts thereto are included in the scope of the disclosure.

EXPLANATION OF SINGS

100: pre-bonding portion
200: bonding portion
210: first bonding portion
220: second bonding portion
230: heat loss prevention cover
300: second coating portion
310: roller portion
400: sheath fabrication portion
500: first coating portion
600: adhesive supply portion
700: second heating portion
750: first heating portion
800: third heating portion
900: fourth heating portion

What is claimed is:

1. Optical fiber cable manufacturing equipment comprising a collective core portion comprising a plurality of optical fibers, a metal tape disposed outside the collective core portion, and a sheath portion disposed outside the metal tape, the optical fiber cable manufacturing equipment comprising:
   a pre-bonding portion configured to pre-bond the metal tape to the outside of the collective core portion;
   a first coating portion disposed behind the pre-bonding portion to coat a first adhesive over at least part of both ends of the metal tape;
   a bonding portion disposed behind the pre-bonding portion to bond the metal tape to the outside of the collective core portion with the both ends of the metal tape overlapping each other;
   a second coating portion disposed behind the bonding portion to coat a second adhesive over the outside of the metal tape; and
   a sheath fabrication portion disposed behind the second coating portion to cover the collective core portion to which the metal tape is bonded, with a sheath,
   wherein an upper portion of the collective core portion to which the metal tape is bonded is heated before the collective core portion to which the metal tape is bonded enters the second coating portion, wherein the second adhesive is coated only over a lower portion of the collected core portion to which the metal tape is bonded in the second coating portion, wherein a melting point of the first adhesive is higher than a melting point of the second adhesive.

2. The optical fiber cable manufacturing equipment of claim 1, wherein the second coating portion comprises an adhesive supply portion configured to supply the second adhesive, a frame, and a roller portion rotatably disposed on the frame to come into contact with the collective core portion to which the metal tape is bonded, wherein the roller portion comprises a recess which is in contact with the collective core portion to which the metal tape is bonded, wherein only a lower portion of the collective core portion to which the metal tape is bonded is received in the recess, and wherein the adhesive supply portion is configured to supply the second adhesive to the recess.

3. The optical fiber cable manufacturing equipment of claim 2, further comprising:

a first heating portion configured to melt the first adhesive supplied from the first coating portion;

a second heating portion configured to heat the roller portion of the second coating portion to melt the second adhesive;

a third heating portion disposed on the bonding portion to heat the collective core portion to which the metal tape is bonded; and a fourth heating portion disposed behind the bonding portion to heat an upper side of the collective core portion to which the metal tape is bonded.

4. The optical fiber cable manufacturing equipment of claim 3, wherein the bonding portion comprises a first bonding portion and a second bonding portion which is disposed behind the first bonding portion and spaced apart therefrom, wherein the fourth heating portion is configured to heat the collective core portion to which the metal tape is bonded, escaping from the first bonding portion, and wherein the optical fiber cable manufacturing equipment further comprises a heat loss prevention cover disposed across the first bonding portion and the second bonding portion, and disposed above the collective core portion to which the metal tape is bonded.

5. The optical fiber cable manufacturing equipment of claim 4, wherein the roller portion comprises a hub comprising a plurality of arms to be rotatably coupled to the frame, and rollers rotatably coupled to the plurality of arms, respectively, wherein any one of the plurality of rollers selectively comes into contact with the collective core portion to which the metal tape is bonded, wherein the second coating portion comprises a support portion fixed to the frame, and a collection container removably coupled to the support portion, and wherein the collection container comprises a body which has a receiving space formed therein and is coupled to the support portion, and a scraper which is extended from the body and comes into contact with the roller that is in contact with the collective core portion to which the metal tape is bonded, among the plurality of rollers.

* * * * *